United States Patent [19]
Klemm

[11] Patent Number: 5,667,387
[45] Date of Patent: Sep. 16, 1997

[54] TELECOMMUNICATIONS CABLES EDUCATION AND TESTING APPARATUS

[76] Inventor: Jonathan R. Klemm, 62 Stonybrook Rd., Blairstown, N.J. 07825-9319

[21] Appl. No.: 543,895

[22] Filed: Oct. 17, 1995

[51] Int. Cl.⁶ ........................................ G01B 7/00
[52] U.S. Cl. ........................ 434/224; 434/219; 434/322
[58] Field of Search ............................. 434/219, 224, 434/322, 335, 338, 366

[56] References Cited

U.S. PATENT DOCUMENTS

| | | | |
|---|---|---|---|
| 3,008,245 | 11/1961 | Meuche . | |
| 3,071,876 | 1/1963 | Swanberg . | |
| 3,955,290 | 5/1976 | Filer | 434/338 |
| 4,332,568 | 6/1982 | Hyink . | |
| 4,464,120 | 8/1984 | Jensen | 434/336 |
| 4,493,655 | 1/1985 | Groff . | |
| 4,623,312 | 11/1986 | Crawford | 434/366 |
| 4,943,238 | 7/1990 | Gregorio | 434/224 |
| 5,267,865 | 12/1993 | Lee et al. . | |

*Primary Examiner*—Jerome Donnolly
*Assistant Examiner*—Glenn E. Richman
*Attorney, Agent, or Firm*—Joseph H. McGlynn

[57] ABSTRACT

A teaching aid which will familiarize students with the various types of electrical connectors and cables used in modern data and voice network wiring. It consists of a training aid which will give students hands on training with all the various types of electrical connectors and cables used in networks. Users will work with the various cable types such as Unshielded Twisted Pair (UTP), Shielded Twisted Pair (STP) and coaxial cables available for use in wiring buildings for telecommunications. The training aid will also familiarize students with the different types of outlets, patch panels, and terminal blocks which are used to terminate these different types of cables, and the use of the outlets which may be wired in a number of different "standard" configurations. Also included is a tester which will verify proper installation of connectors and will help locate the source of trouble in previously installed connectors.

6 Claims, 6 Drawing Sheets

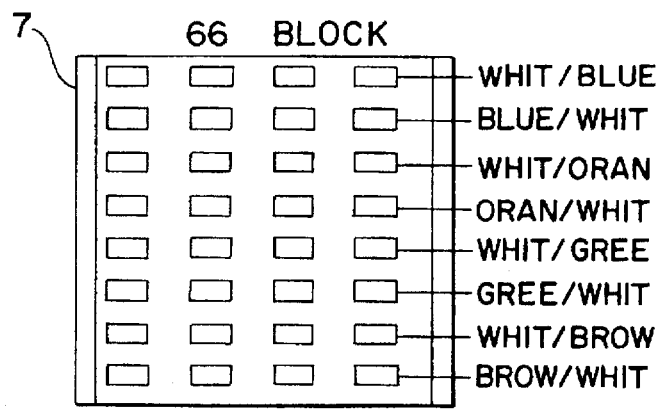
FIG. 9A
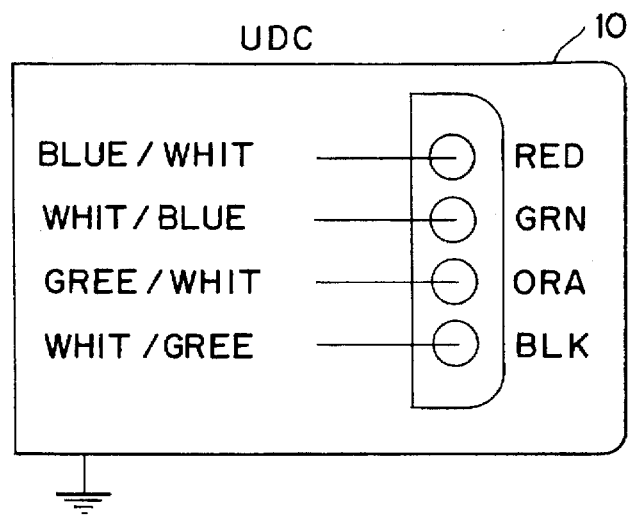
FIG. 9B
FIG. 9C
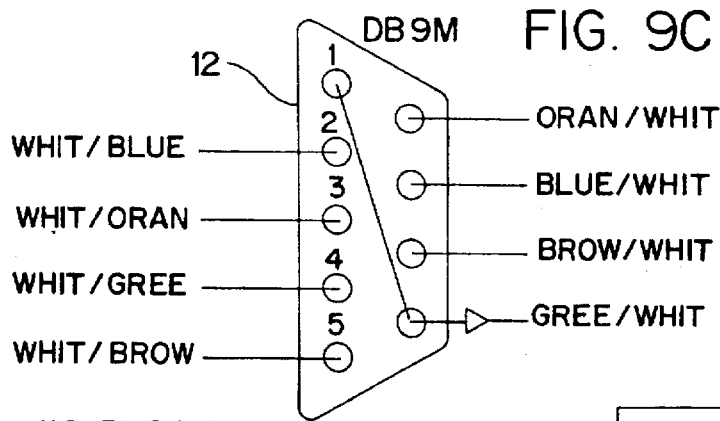
FIG. 9E
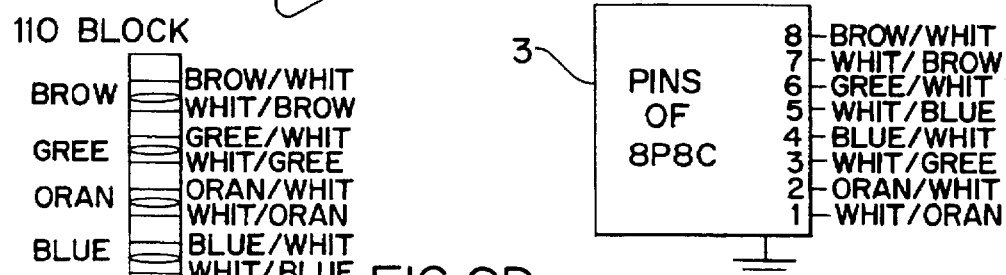
FIG. 9D

TELECOMMUNICATIONS CABLES EDUCATION AND TESTING APPARATUS

BACKGROUND OF THE INVENTION

This invention relates, in general, to teaching aids, and, in particular, to a teaching aid for use with telecommunications cables and a testing apparatus for use therewith.

In the business community today, as well as schools, hospitals, and manufacturing plants, more and more business are turning to data and voice networks in order to successfully compete in today's market place. Networks are becoming more and more common place in handling communications within companies and with customers and affiliates throughout the United States and the world.

At present there is a great need for companies to have properly installed networks that are reliable and can be altered to meet the ever changing demands as companies grow and expand. In order to meet this demand for ever expanding networks it is necessary to have properly trained personnel who can install and service data and voice networks. They must be familiar with all the connectors and cable types that are utilized in modern network systems and must be able to, not only install, but also maintain such networks after installation.

Therefore, there is a need for trained technicians with the proper knowledge to install and maintain modern network systems. In order to train these people in proper techniques the present invention was developed.

DESCRIPTION OF THE PRIOR ART

In the prior art various types of teaching aids have been proposed. For example, U.S. Pat. Nos. 3,008,245 and 3,071,876 disclose kit containing electrical connectors and electrical components which teach students how to build and test electrical circuits. U.S. Pat. No. 4,332,568 discloses a kit containing ordinary household receptacles and switches which teach students how to install various electrical devices used in the home. U.S. Pat. No. 4,493,655 discloses a wireless radio controlled teaching device which allows a teacher to monitor a student's progress. U.S. Pat. No. 5,267,865 discloses an educational system which monitors a student's progress and utilizes audio-visual aids and computer technology.

SUMMARY OF THE INVENTION

The present invention consists of a teaching aid which will familiarize students with the various types of electrical connectors and cables used in modern data and voice network wiring. It consists of a training aid which will give students hands on training with all the various types of electrical connectors and cables used in networks. Users will work with the various cable types such as Unshielded Twisted Pair (UTP), Shielded Twisted Pair (STP) and coaxial cables available for use in wiring buildings for telecommunications. The training aid will also familiarize students with the different types of outlets, patch panels, and terminal blocks which are used to terminate these different types of cables, and the use of the outlets which may be wired in a number of different "standard" configurations. Also included is tester which is wireless and will verify proper installation of connectors and will help locate the source of trouble in previously installed connectors.

It is an object of the present invention to provide a training aid for instructing students in the various cable types such as Unshielded Twisted Pair (UTP), Shielded Twisted Pair (STP) and coaxial cables available for use in wiring buildings for telecommunications.

It is an object of the present invention to provide a training aid for instructing students in the use of different types of outlets, patch panels, and terminal blocks which are used to terminate different types of cables.

It is an object of the present invention to provide a tester which is wireless and will verify proper installation of connectors and will help locate the source of trouble in previously installed connectors.

These and other objects and advantages of the present invention will be fully apparent from the following description, when taken in connection with the annexed drawings.

BRIEF DESCRIPTION OF THE DRAWINGS

FIG. 9 is a schematic view showing the wires with the various color designations for the connectors of the teaching aid of the present invention.

DESCRIPTION OF THE PREFERRED EMBODIMENT

Figure 1:
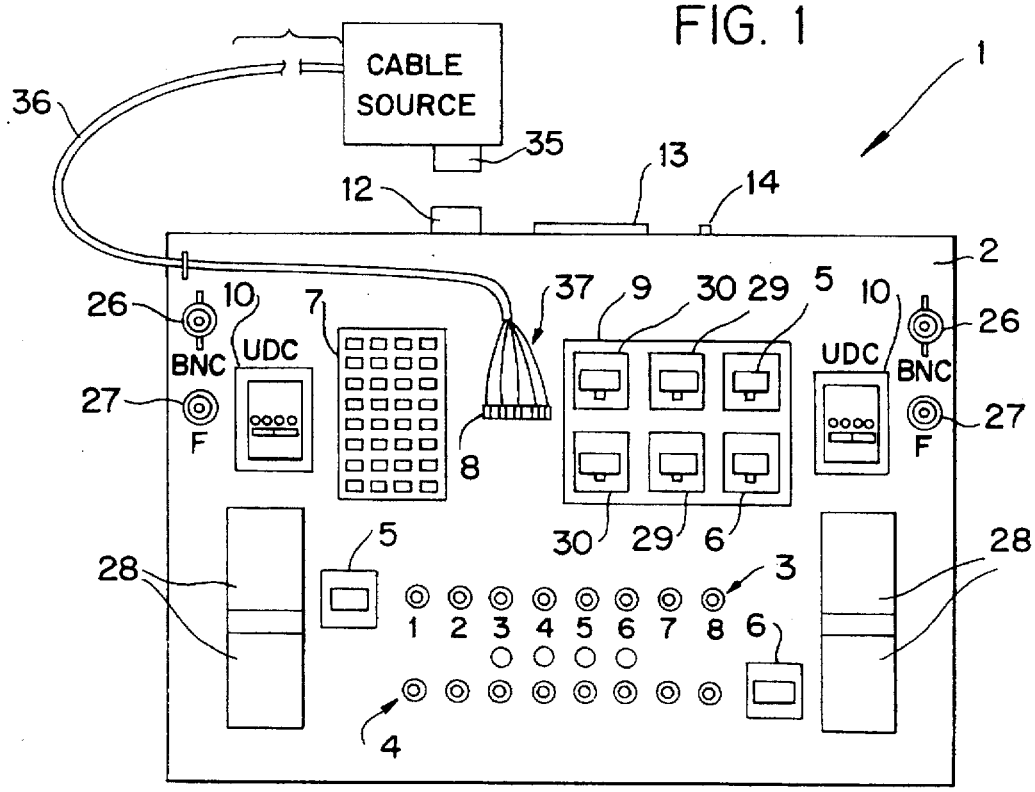
FIG. 1 is a plan view of the teaching aid of the present invention.

Referring now to the drawings in greater detail, FIG. 1 shows a plan view of the teaching aid, the Advanced Cable Trainer (ACT) 1 of the present invention. The ACT unit is a container having on its top face various types of electrical connectors. Toward the bottom is two rows of jacks 3 and 4. The jacks 3 are red and the jacks 4 are black to help students visually differentiate between the two rows, although other colors could be used. Each row contains eight jacks which correspond to the eight pins in the 8P8C jacks 5 and 6. The jacks 3 are electrically connected to the 8P8C jack 5 and the jacks 4 are electrically connected to the 8P8C jack 6. In between the two rows of jacks 3, 4 are four indicia 28 which are color coded for the IBM Type 1 cable system. The indicia are colored (from the left side of FIG. 1) black, red, green, orange, although other colors could be used. The unit also has a 66 connecting block 7 and a 110 connecting block 8 which are electrically connected to two of the connectors in the patch panel 9. the patch panel 9 contains six 8P8C jacks which enable students to simulate Workstation to equipment room connections and to configure and test various cabling scenarios such as 8P8C to 110 block connections or 8P8C to 66 block connections. The connectors 30 are electrically connected to the 110 block and connectors 29 are electrically connected to the 66 block. Connectors 5, 6 in the patch panel 9 are connected to the 8P8C jacks 5 and 6 on the lower portion of the panel 2.

Adjacent the 66 connecting block 7 and the patch panel 9 are two Type 1 (IBM Cabling System) jacks 10. Adjacent these jacks are a BNC connector 26 and an Fconnector 27. On the top side of the unit 11 are positioned a DB9 connector 12 which allows external ACT peripherals to be connected to the unit 1 and a conventional battery compartment 13, which holds two 9-volt batteries, and an on-off switch 14. It should be noted that the although a specific connector 12 is shown for connecting a cable supply to the unit 1, this is merely for illustrational purposes, and any type of connector that will perform the intended function can be used without departing from the scope of the invention.

The DB9 connector 12 mates with a connector 35 which has a conductor 36 with a connector 37 attached on the other end of the conductor 36. The connector 37 can be engaged with various connectors on the ACT panel, such as connector block 7, 8 to simulate connections to telephone closets.

Figure 8:
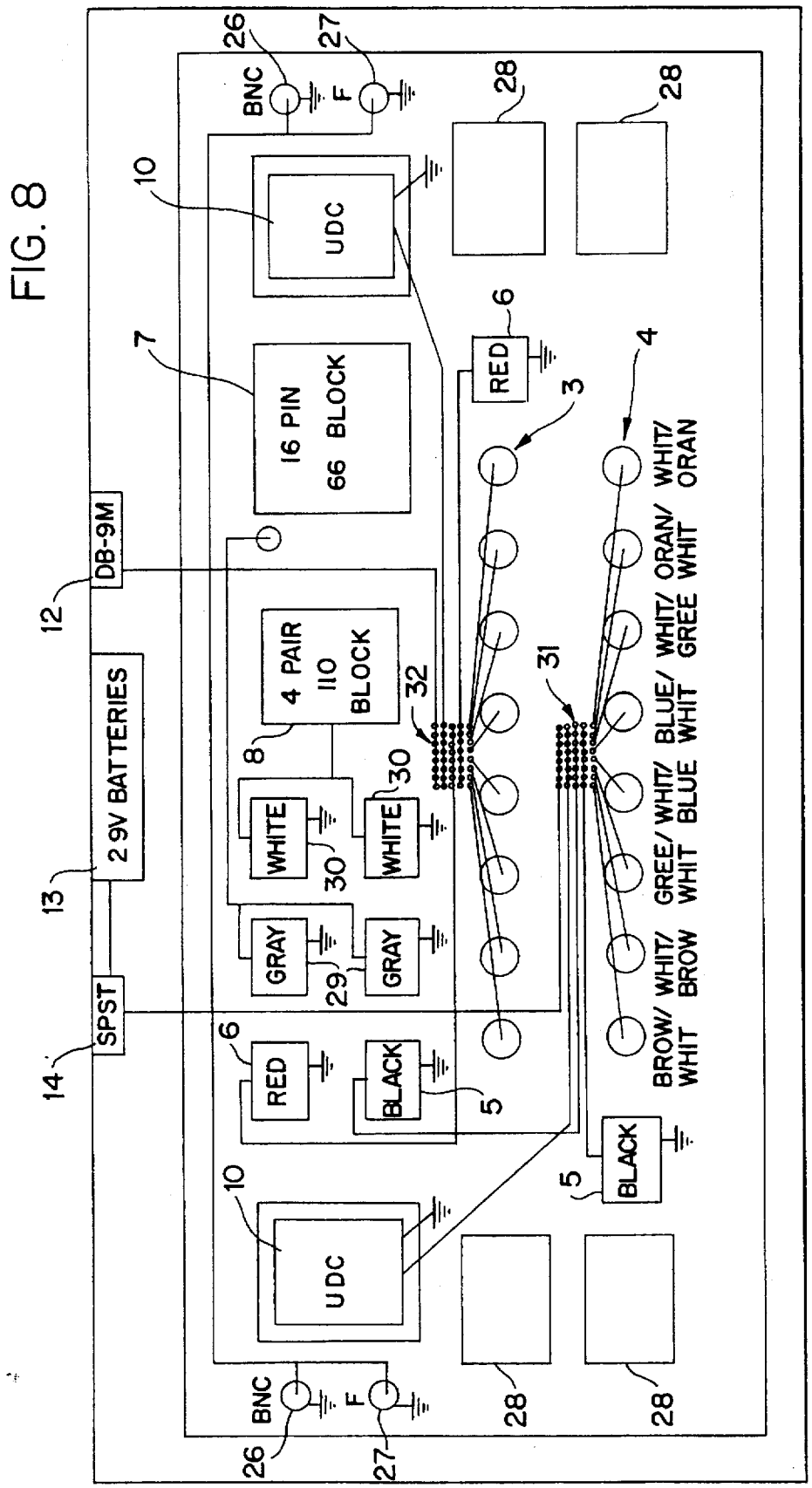
FIG. 8 is a schematic view showing the wiring of the teaching aid of the present invention.

The 9-volt batteries are connected to the switch 14 and from there to the circuit board 31 and from there to the pin jacks 4, connectors 5 and 10 (as shown in FIG. 8). The other battery lead is connected to the circuit board 32 and from there to the pin jacks 3, connectors 6 and 10 (as shown in FIG. 8). This circuit simulates a circuit of 18 volts which will enable students to perform exercises such as check for continuity in the circuit.

Figure 5:
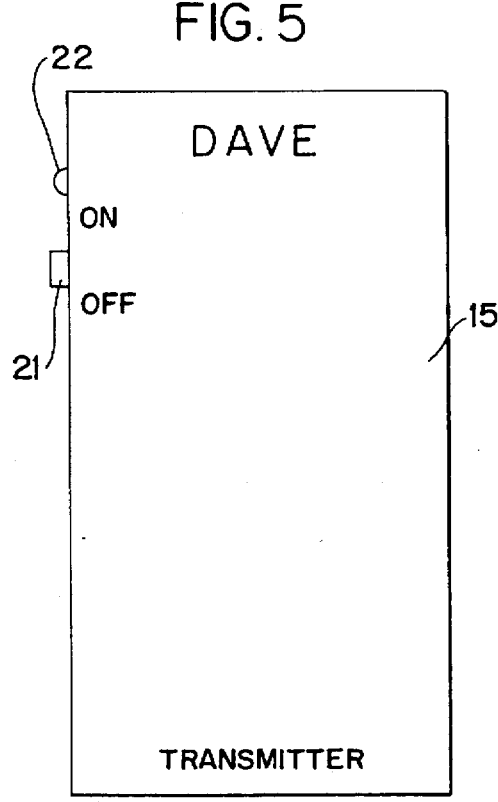
FIGS. 5 and 6 are plan views of the transmitter and receiver of the tester of the present invention.
Figure 6:
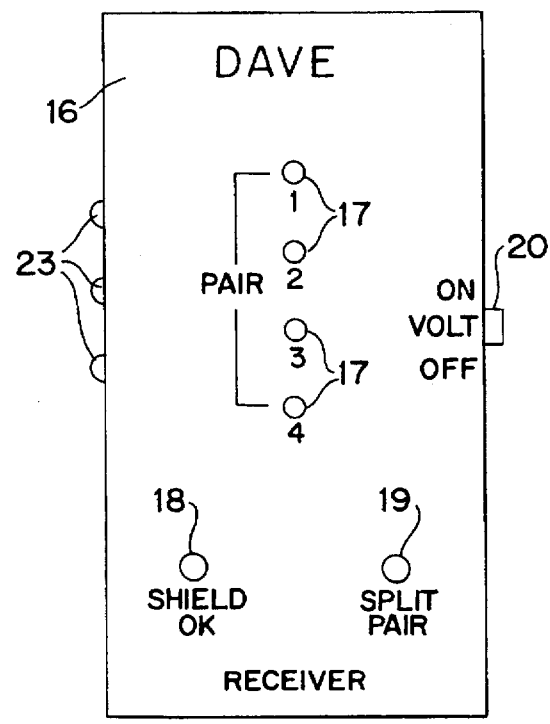

In FIGS. 5 and 6 the cable tester is shown. The tester is a Data, Voice, Electric (DAVE) tester which consists of a transmitter 15 and a receiver 16. Both units have an on-off switch, 21 on the transmitter and 20 on the receiver. The transmitter has an LED 22 to indicate the unit is switched on and a conventional battery compartment which holds a battery (not shown) to supply power to the unit.

The receiver unit 16 has a similar on-off switch 20 on the side of the unit, however this switch has a protection mode which is not present in the transmitter unit 15. When the receiver switch is turned on, while the receiver is connected to a circuit, the receiver will be protected if voltage is present in the circuit to which the unit is connected. If voltage is present, one or more of the LED's 23 will glow a bright green or red, or both depending on the situation. This will tell the student that DAVE should be disconnected from the circuit and corrective action should be taken before proceeding. The four LED's 17 in the center of the receiver are identified with a number from 1 to 4, and represent the four pair which can be tested at any one time by DAVE. These LED's illuminate either "green", indicating a good or straight through condition, or "red", which indicates a "reversal" (positive and negative polarity is reversed). There are two other LED's 18 (green) and 19 (red) located at the bottom of the receiver. The red LED and a dimly lit pair LED 17 will illuminate if the cable pair being tested is split. A split occurs when the transmit of a pair is terminated with the transmit of another pair. If only the green LED illuminates, it indicates that the shield of a STP cable is properly terminated.

Figure 2:
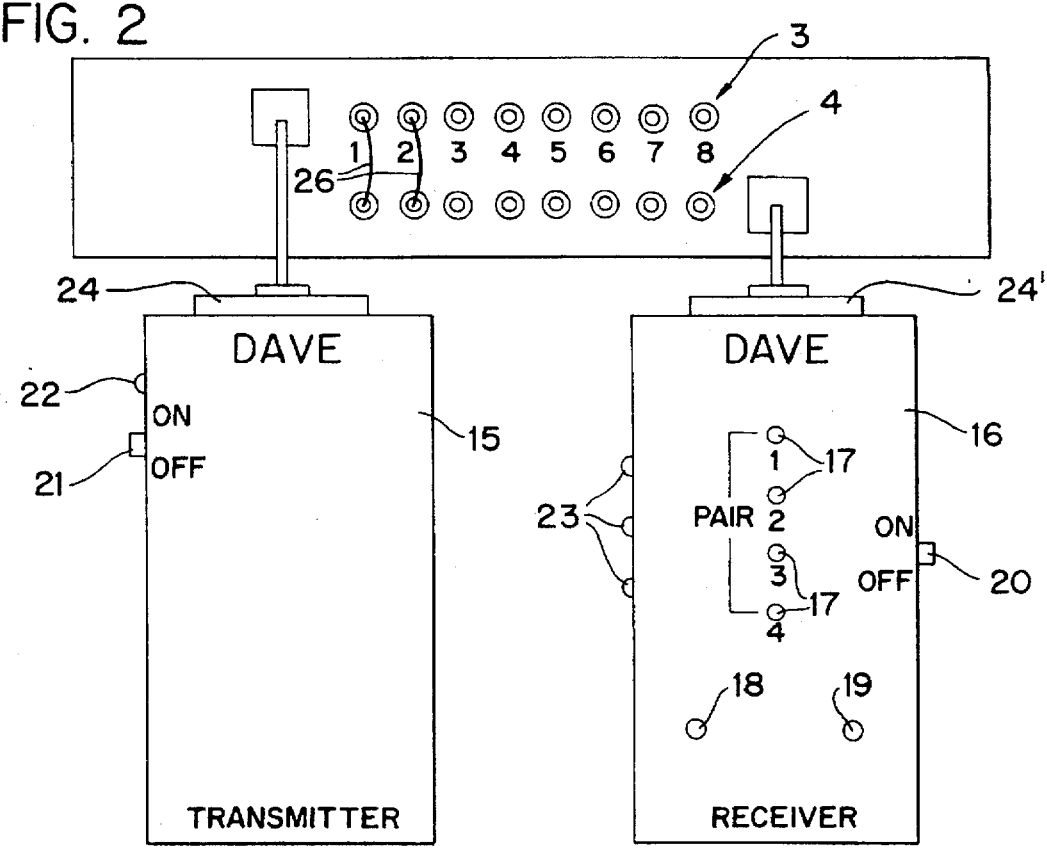
FIG. 2 is a plan view of the teaching aid of the present invention with the tester.
Figure 3:
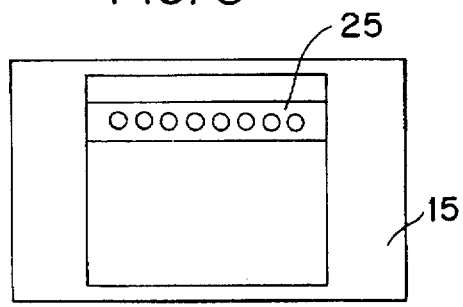
FIGS. 3 and 4 are top views of the transmitter and receiver of the tester of the present invention.
Figure 4:
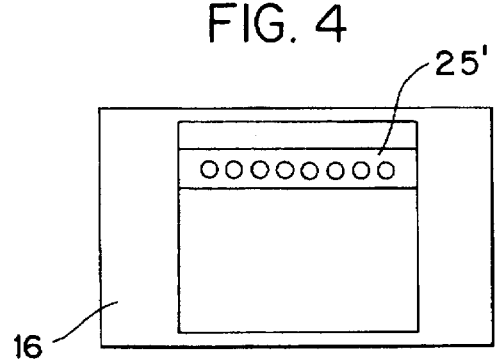

Through the use of replaceable adaptors, shown at 24 and 24' in FIG. 2, DAVE can be configured to test several different wiring schemes including EIA/TIA, 568A, 568B, USOC, 10Base T, and Token Ring. Different cabling types such as Coax, Type 1, and Shielded Twisted Pair can also be tested by inserting different adaptors. The adaptors are connected to the transmitter 15 and the receiver 16 by means of connectors 25 and 25' in the top of the respective units, as shown in FIGS. 3 and 4. The adaptors are electrical wires with a connector on opposite ends. One of the connectors will mate with the connectors 3–10, 29, 30 on the DAVE unit, and the other connector will mate with the connectors 25, 25' on the transmitter and receiver 15, 16, respectively.

FIG. 2 shows the DAVE units (transmitter and receiver) connected to the 8P8C jacks 5 and 6 by the adaptors 24 and 24' in order to test the wiring between the two jacks. If the LED's 17 are all off, this generally indicates an open condition exists on all four pair, i.e. the jacks are not electrically connected. In order to connect the jacks 5 and 6, pin jumpers 26 will be connected between two of the jacks 3 and two of the jacks 4, as shown in FIG. 2. This will electrically connect the two jacks and some of the LED's 17 on the receiver will be illuminated. By continuing to insert pin jumpers into the jacks 3 and 4 all of the contacts in the jacks will be connected and the LED's 17 on the receiver will be green. If one or more of the LED's are not green, this indicates an improper connection and the student will go back and check his/her jack connections until all the LED's are green, indicating a proper or "straight-through" connection. Depending on which pin jumpers 26 are connected to which jacks 3 and 4, various improper connections can be demonstrated, and will be indicated by different combinations of LED's 17 showing either a green or red LED. This will indicate to the student which problem exist and they will learn the proper procedure for correcting the problem.

By using different adaptors, connected to the sockets 25 or 25', the transmitter 15 and the receiver 16 of DAVE can be connected to various connectors 5–10, 29, 30 on the ACT unit. In this manner students will learn how to make proper connection between the various connectors 5–10, how to recognize improper connections through the use of the different colors on the LED's 17, and how to correct the improper connections.

FIG. 8 shows the underside of the ACT unit 1 and shows the various wires which interconnect the connectors 3–10, 29, 30. Also shown are the on-off switch 14, the battery compartment 13, and the peripheral connector 12. Again, the various connectors shown are merely illustrations and different connectors 3–10, 29, 30 and 12, or different numbers of the connectors may be used without departing from the scope of the invention. For example, in FIG. 1 only two pair of 8P8C connectors 5 and 6 are shown, but more of these connectors could be used if desired. The connectors can be chosen to present different connector situations to the students or to incorporate new connectors as they become available to the industry. Also, shown in FIG. 8 is four compartments 28 which are used to store the various adaptors 24 or 24', which are used with the transmitter and receiver of the DAVE unit.

Figure 10:
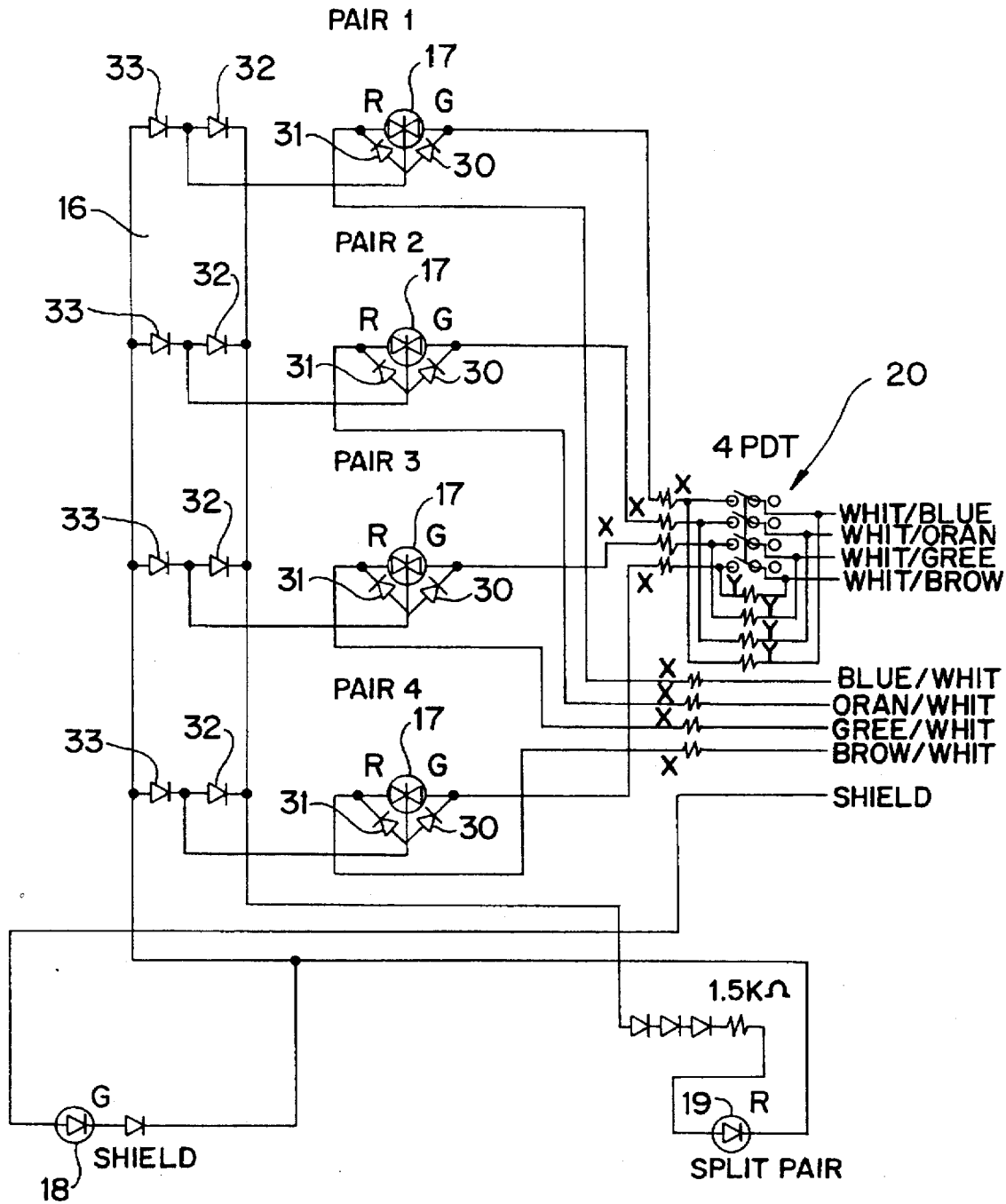
FIG. 10 is a schematic view showing the wiring of the receiver portion of the tester of the present invention.

FIG. 10 shows a schematic wiring diagram of the receiver unit 16 of DAVE, showing the LED's 17, the shield and split pair indicators 18 and 19, respectfully, and the switch 20. Since the various components are conventional electronic components and can be wired using conventional wiring techniques, such as printed circuit boards or hard wiring, no further explanation of the circuitry will be given.

FIG. 9 shows the various connectors used in the ACT unit 1 with the various colors of the wires used to connect to the contacts in the connectors.

Figure 7:
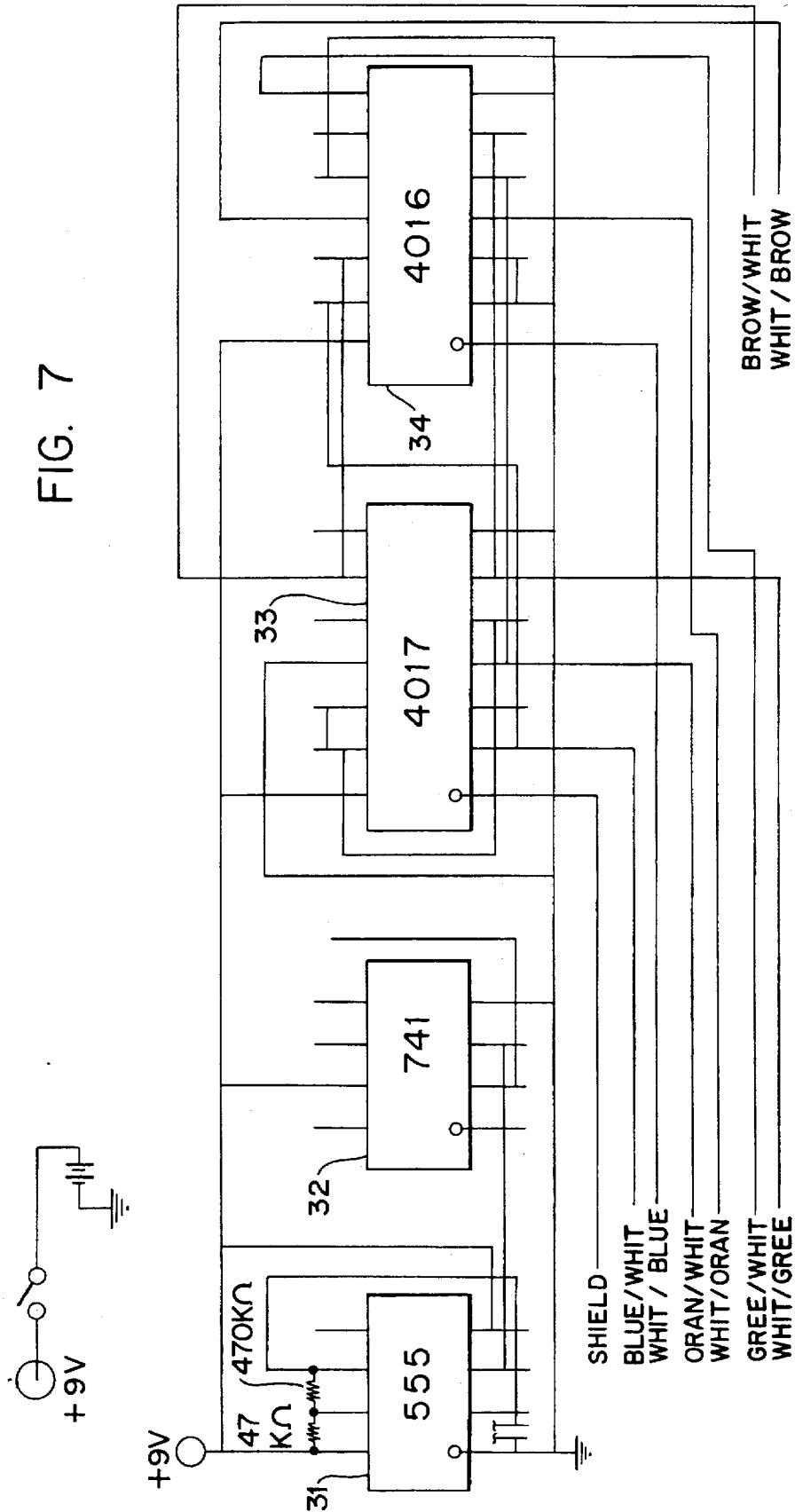
FIG. 7 is a schematic view showing the wiring of the transmitter portion of the teaching aid of the present invention.

FIG. 7 shows schematically the wiring for the transmitter 15 on the DAVE unit showing the various components such as the I.C. timer 31, the operational amplifier 32, the CMOS decade counter 33, and the CMOS quad bilateral switch 34. Also shown is the wire color scheme used in the wiring circuit.

In use the DAVE transmitter, when it is connected to the ACT unit sends out an active signal from the CMOS decade counter 33 to the connector 25 and from there through the adaptor 24 to one of the connectors on ACT, for example jack 5, then though the jacks 3, 4, and then to jack 6. At the same time this is happening the transmitter closes the CMOS quad bilateral switch 34 which allows a completed circuit within the transmitter. Any non-active connections on the CMOS decade counter 33 also act as grounds and allow for shorting and other tests. The DAVE receiver 16 which is connected to the jack 6, for this example as shown in FIG. 2, receives this signal from jack 6, through one of the wires in the adaptor 24'. The signal goes through the LED's 17 and then is returned through another wire in the adaptor 24', to the jack 6, though the jacks 3, 4, and back to jack 5 and from there through one of the wires in adaptor 24, and finally to the transmitter 15. This complete circuit allows students to make a variety of connections on the ACT panel using actual connectors and to check the circuits using the DAVE tester. This allows hands-on use of the connectors and also allows the students to become proficient in problem solving techniques.

FIG. 7 also shows the actual chips used in the DAVE transmitter. For example, the chip 31 is used to create a pulse pattern. The chip 32 is used to modify and stabilize the pulse pattern. Chip 33 is a decade counter which is activated by the signal from the operational amplifier 32. The CMOS quad bilateral switch 34 switches the signal to its proper output pins. These chips are conventional chips used in the art and perform their normal functions.

Although the telecommunications cables and testing apparatus and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. a telecommunications cable and testing apparatus comprising:

a panel having a front side and a back side, said front side having a plurality of connectors mounted thereon, said plurality of connectors being of different types, means for connecting at least one battery attached to said panel for providing electrical power to said panel, switch means for interrupting said electrical power, wiring means on said back side of said panel for electrically interconnecting selected ones of said plurality of connectors, a two part testing unit adapted to be connected to said selected ones of said plurality of connectors, one of the units of said two part testing unit having indicator means for indicating whether said selected ones of said plurality of connectors have been properly electrically connected, and wherein said one of the units of said two part testing unit has additional indicator means for indicating improper shield connections and improper split pair connections between selected ones of said plurality of connectors.

2. The telecommunications cables and testing apparatus as claimed in claim 1, wherein said indicator means is a plurality of LED means which will light up in different colors to indicate various types of improper connections between selected ones of said plurality of connectors.

3. The telecommunications cables and testing apparatus as claimed in claim 1, wherein each of said two part testing unit is connected to selected ones of said plurality of connectors by adaptors, each of said adaptors having a first connector which mates with a connector on one of the two parts of said testing unit and a second connector which mates with selected ones of said plurality of connectors.

4. A telecommunications cable and testing apparatus comprising:

a panel having a front side and a back side, said front side having a plurality of connectors mounted thereon, said connectors being mounted in groups with the connectors in one group being of a different type from the connectors in another group, means for connecting at least one battery attached to said panel for providing electrical power to said panel, switch means for interrupting said electrical power, first wiring means on said back side of said panel for electrically interconnecting selected ones of said plurality of connectors within one of said groups to other connectors within the same group, and connector means on said front side of said panel for selectively interconnecting at least one of the connectors in one group with one of the connectors in another group, and second wiring means on said back side of said panel for electrically interconnecting selected ones of said plurality of connectors within one of said groups to other connectors within another group, whereby a user may built a plurality of different circuits by interconnecting said connectors within the groups or the connector means on said front side of said panel.

5. The telecommunications cable and testing apparatus as claimed in claim 4, in combination with a two part testing unit adapted to be connected to said connector means on said front side of said panel, one of the units of said two part testing unit having indicator means for indicating whether said selected ones of said connector means have been properly electrically connected.

6. The telecommunications cable and testing apparatus as claimed in claim 5, wherein one of the units of said two part testing unit is a transmitter and the other one of the units of said two part testing unit is a receiver.

* * * * *